Dec. 9, 1952 B. W. JONES ET AL 2,620,687
LENS DRILLING MACHINE
Filed March 11, 1949 5 Sheets-Sheet 1

Inventors
BURR W. JONES
GEORGE C. SCHELLING
Attorney

Dec. 9, 1952 — B. W. JONES ET AL — 2,620,687
LENS DRILLING MACHINE
Filed March 11, 1949 — 5 Sheets-Sheet 4

Inventors
BURR W. JONES
GEORGE C. SCHELLING
Attorney

Dec. 9, 1952 B. W. JONES ET AL 2,620,687
LENS DRILLING MACHINE
Filed March 11, 1949 5 Sheets-Sheet 5

Inventors
BURR W. JONES
GEORGE C. SCHELLING
Attorney

Patented Dec. 9, 1952

2,620,687

UNITED STATES PATENT OFFICE 2,620,687

LENS DRILLING MACHINE

Burr W. Jones, Rochester, and George C. Schelling, Irondequoit, N. Y., assignors to Bausch & Lomb Optical Company, Rochester, N. Y., a corporation of New York Application March 11, 1949, Serial No. 80,824

3 Claims. (Cl. 77—21)

The present invention relates to improvements in glass drilling machines and more particularly to machines for drilling ophthalmic lenses and the like.

In order to drill a hole through a lens or like object without chipping the outer edges thereof, the hole must be drilled only part way through the lens from one side, the remaining part of the hole being drilled from the opposite side of the lens coaxially with the first part. To facilitate this method of drilling, the mechanism for holding the lens is usually made movable so that the opposite sides of the lens may be presented to the drill in successive operations without unclamping the lens. However, such mechanisms, because of the mobility of the lens clamping mechanism, have inherent manufacturing and operational difficulties and necessarily become loose and unreliable because of wear on their moving parts. This invention obviates these difficulties by holding the lens rigidly stationary while a hole is drilled completely through the lens so as to prevent any harmful vibration or shake of the lens. Combined with the lens clamping mechanism is a dual drill spindle structure and other mechanisms which facilitate this type of lens drilling.

It is an object of this invention to provide a novel glass drilling machine for lenses or the like in which the lens is rigidly held in a stationary position while a hole is drilled in the lens to completion from opposite sides.

Another object of this invention is to provide such a device having clamping mechanism for reliably holding a variety of shapes, curvatures and sizes of lenses in a position of good visibility and easy accessibility for the operator.

It is a further object to provide a lens clamping mechanism in which one of the lens clamping jaws is automatically adjusted, relative to a cooperating clamping jaw, for different edge thicknesses of lenses simultaneously with movements of a device for measuring the thickness of a lens.

Another object is to provide such a device incorporating a gauge for measuring the screw hole location in the lens anchoring ears of spectacle mountings and transferring that location to an edge distance locating device for the lens.

A further object is to provide a lens drilling machine in which a pair of coaxial drills, which are axially movable in unison, operate on opposite sides of a rigidly held lens to drill a substantially cylindrical hole which requires no finishing operation such as reaming.

It is another object to provide such a device having its drill spindles and associated bearing structure constructed as sub-assembly units which may be easily and quickly removed, replaced, or adjusted.

These and other objects and advantages reside in the novel details of construction and combination of parts as will be evidenced by reference to the following description and accompanying drawings in which:

Figure 1:
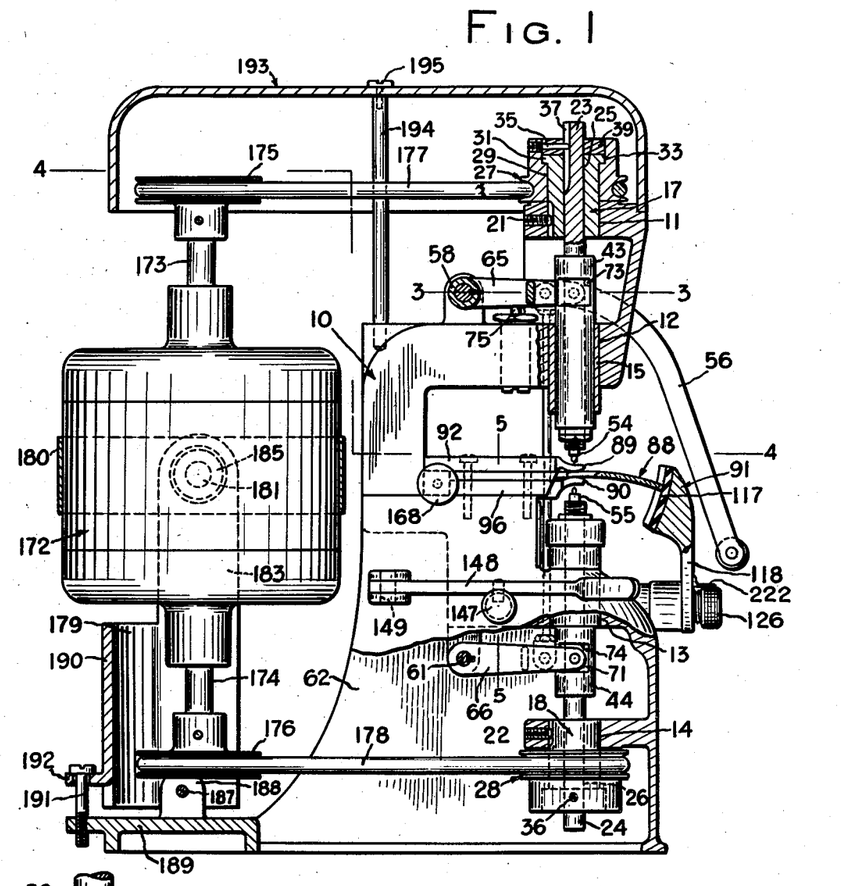
Fig. 1 is a side elevational view of a lens drilling machine embodying one form of our invention with parts shown in section.

In Fig. 1 of the drawings, wherein one embodiment of this invention is illustrated, a frame 10 is provided with two pair of vertical, axially aligned openings 11, 12 and 13, 14 therethrough. In the intermediate openings 12 and 13, a pair of intermediate bearing members 15 and 16 are fixed in any suitable manner such as a friction fit and in the outer openings 11 and 14, a pair of outer bearing members 17 and 18 are removably held in the frame. The word "intermediate" appearing herein designates the innermost members which are adjacent to each other. For the purpose of holding the outer bearing members 17 and 18 in place, set screws 21 and 22, threaded in the frame 10, are provided which bear against suitable flats formed on said bearing members.

An important features of our invention resides in the form of the drill spindle structure which comprises a pair of axially aligned drill spindles 23 and 24 which are journaled for rotational and axial motion at their outer ends within the bores 25 and 26 of the outer bearing members 17 and 18, respectively. The spindles 23 and 24 are arranged in opposed and spaced relation to each other and are journaled within the frame at their inner ends as described hereinafter. The form and arrangement of the drilling mechanism is shown in detail in Fig. 2, and the upper and lower drill spindle structures are similar to each other so that only the lower assembly is shown in detail therein.

Each of the drill spindles 23 and 24 is individually driven by a drive member of suitable form such as the drive pulleys 27 and 28, respectively. The drive pulleys are rotatably journaled on cylindrical bearing surfaces 29 and 30 on bearing members 17 and 18, respectively, which project beyond the frame 10, and are prevented from endwise movement by radial annular flanges 31 and 32 on the outer bearing members 17 and 18, respectively, which fit freely within corresponding annular recesses 33 and 34 in their respective pulleys. Pulleys 27 and 28 are slidably keyed to the respective drill spindles 23 and 24 by means of drive pins 35 and 36 anchored in the pulleys so as to project inwardly thereof and slidably engage within a pair of keyways 37 and 38 on the spindles 23 and 24 respectively. The drive pins 35 and 36 also form means for respectively holding a pair of closure disks 39 and 40 in the annular recesses 33 and 34, since the drive pins extend through holes in the disks to enter the keyways 37 and 38.

At the inner ends of the drill spindles 23 and 24, elongated operating sleeves 43 and 44, slidably journaled respectively in the intermediate bearing members 15 and 16, are provided to receive the drill spindles which are rotatably journaled but are restrained from endwise movement relative thereto. In this form of the invention, the relative endwise movement in one direction is prevented preferably by a pair of collars 45 which are fixed on the spindles in any suitable manner such as the set screws shown in Fig. 2, said collars fitting freely within counterbores 46 at the outer ends of the sleeves 43 and 44. Relative movement in the opposite direction is prevented by thrust bearings 47 housed within the counterbores 49 in the other end of the sleeves and are held therein by the lock nuts 51 threaded on the inner ends of the spindles. Openings 52 and 53 concentric with the drill spindles 23 and 24 respectively, are provided in the adjacent inner ends of the spindles in which the upper and lower drilling tools 54 and 55, respectively, are held in any desired manner such as by the set screws shown in Fig. 2.

Figure 4:
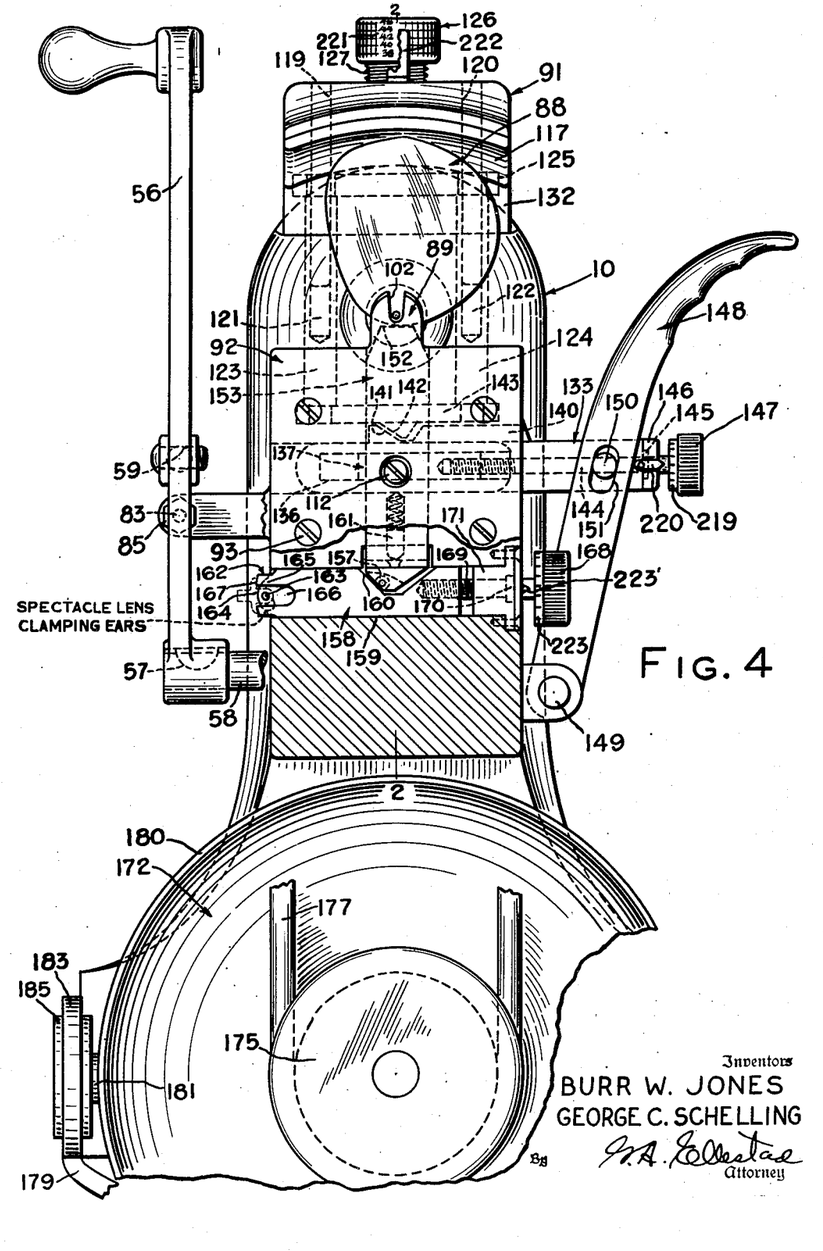
Fig. 4 is a horizontal sectional view taken substantially on the line 4—4 of Fig. 1.
Figure 5:
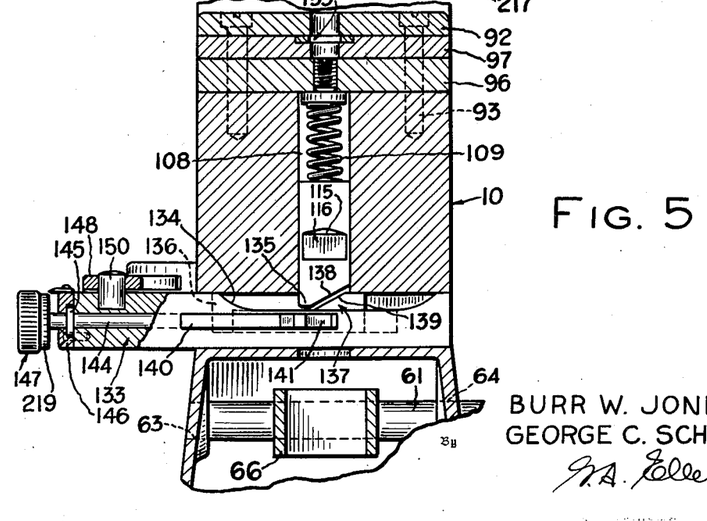
Fig. 5 is a vertical sectional view taken on the line 5—5 of Fig. 1.
Figure 6:
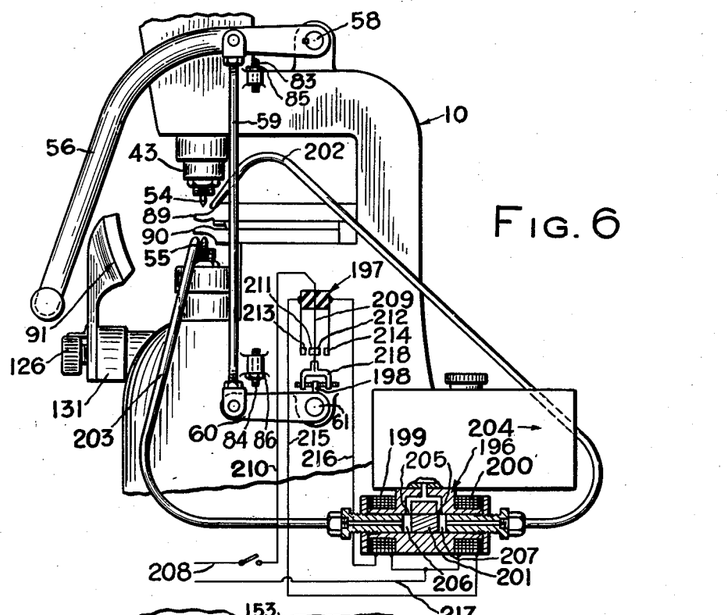
Fig. 6 is a somewhat schematic view showing at a reduced scale and in side elevation, the lubricating mechanism for the drills.

Feed means are provided for reciprocating both of the drill spindles simultaneously in the same direction comprising a hand lever 56 connected in any preferred manner, such as the keyed connection 57 shown in Fig. 4, to an upper operating shaft 58 which is connected to the upper spindle and by an adjustable link member 59 to a lower operating lever 60 which is pivotally connected to the lower spindle as shown in Fig. 6. Operating lever 60 is suitably fixed on a lower operating shaft 61 which extends through the frame 10 at 63 and 64 into the hollow base portion 62 as best shown in Fig. 5. On the operating shafts 58 and 61, upper and lower bifurcated shift forks 65 and 66, respectively, are fixed in any preferred manner such as the keyed connection 67.

Figure 3:
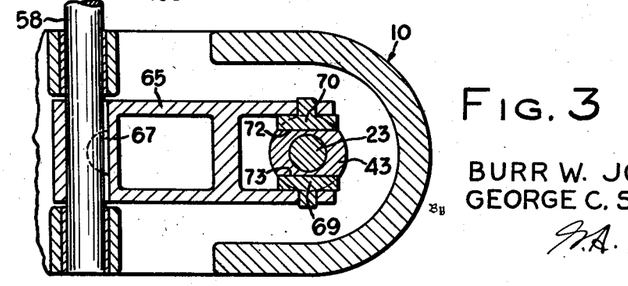
Fig. 3 is a fragmentary sectional view taken on the line 3—3 of Fig. 1.

The free ends of the forks 65 and 66 are tractively connected to the respective sleeves 43 and 44 by a pair of inwardly projecting keys 69, 70 for the upper sleeve 43 shown in Fig. 3, and by a corresponding pair of keys, one of which is shown at 71 of Fig. 1, for the lower sleeve 44. Both of the above mentioned pairs of keys are pivotally mounted inwardly on the opposite furcations of their respective forks 65 and 66 and slidably fit within a corresponding pair of mutually parallel slots 72, 73 transversely formed in the upper operating sleeve 43 and a similar pair of slots, one of which is shown at 74, for the lower sleeve 44.

Figure 2:
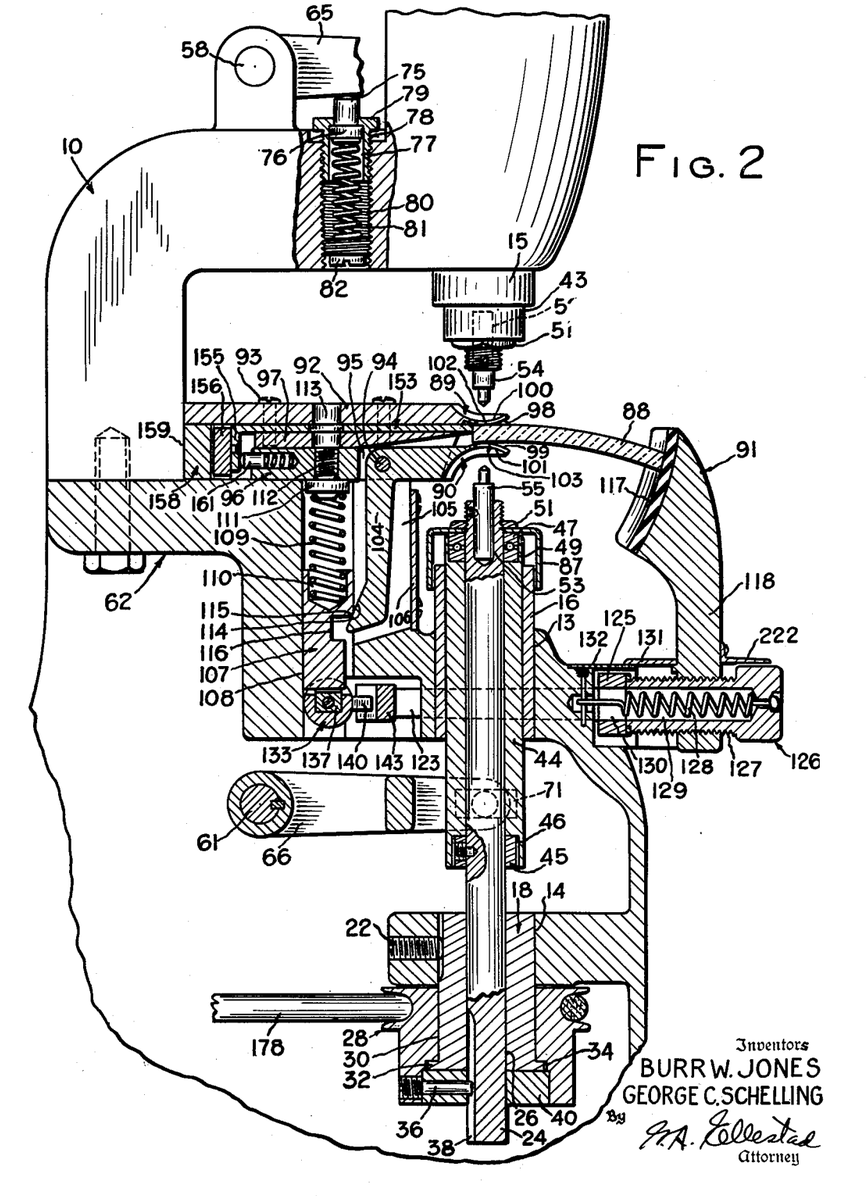
Fig. 2 is a partial vertical sectional view taken substantially on the line 2—2 of Fig. 4.

A yieldably mounted plunger 75, against which the fork 65 rests, is provided for normally keeping the drill spindles 23 and 24 in inoperative position as shown in Fig. 2. The upper position of the plunger 75 corresponds to the "normal inoperative position" of the drill spindles and is established by the engagement of a shoulder on the enlarged head portion 76 of the plunger 75 against an inner shoulder in the counterbore 77 formed within a plunger retaining thimble 78. A spring 81 lies within the counterbore 77 and bears against the underside of the head 76. Thimble 78 is threaded on its outer surface to engage within a threaded opening 80 in the frame 10 and an exposed hexagonal flange 79 is provided whereby the thimble may be rotated to change the normal inoperative position of the drill spindles. The strength of the spring 81 is adjusted by a screw abutment plug 82 threaded into the lower end of the opening 80.

In order to limit the stroke of the spindles 23 and 24 in either direction, spindle stop screws 83 and 84 are provided, as shown in Fig. 6, on the exterior surface of the frame 10 substantially in the plane of motion and in proximity with the hand lever 56 and operating lever 60, respectively. The stop screws 83 and 84 are threaded for adjustment into bosses on the frame as shown in Fig. 6 and are provided with lock nuts 85 and 86, respectively, by which the adjustment is fixed.

To prevent entrance of foreign matter to the thrust bearing 47, the intermediate bearing member 16 is extended above the frame 10 in which it is held and a protective cap 87 is held thereon in telescoping relation over the bearing member 16 by the lock nut 51.

According to this invention, clamping means are provided for holding an ophthalmic lens 88 in a fixed position with reference to the frame 10 while a hole is drilled to completion in the lens. One form of lens clamping mechanism, shown in Fig. 2, comprises a stationary upper jaw 89, aligned with a movable lower jaw 90, so as to clamp the lens 88 therebetween adjacent its edge and on its refractive surfaces. Additionally, the clamping means comprises an outer support member 91 adapted to press against the edge of the lens at a position substantially opposite to said jaws as will be hereinafter described. The upper jaw 89 is preferably formed integrally with an upper plate 92 held by the screws 93 on the frame 10. Movability of the lower jaw 90 with reference to the upper jaw 89 is attained in this form of the invention by pivoting it on a pivot pin 94 within a guiding recess 95 in a lower plate 96 which serves to align the lower jaw with the upper jaw. An intermediate plate 97 fills the space between plates 92 and 96 and the screws 93 extend through these three plates to securely hold them in correct relative position.

By referring to Fig. 2, it will be seen that the clamping surfaces 98 and 99 on the jaws 89 and 90, respectively, are somewhat spherically shaped so as to clamp either a concave or a convex lens surface of any ordinary degree of curvature with equal effectiveness. Preferably the jaws 89 and 90 are formed with concave recesses 100 and 101 on the sides opposite to the clamping surfaces 98 and 99 so that the center portions which are in contact with the lens are reduced in thickness for improving visibility of the drilling operation while retaining ample rigidity. Open-ended flared slots 102 and 103, as best shown in Fig. 4, having clearance for the drilling tools 54 and 55, are formed longitudinally in the jaws 89 and 90 to enable the operator to see the spot to be drilled and for facility in cleaning the jaws. As shown in Fig. 2, the movable jaw 90 has a vertical lever arm 104 thereon extending downwardly into an opening 105 in the frame 10. This opening is closed on its outer side by a closure plate 106 which is attached in any preferred manner to the frame.

Clamping pressure is applied to the lever arm 104 to move it and lock it unyieldingly in clamping position by a locking plunger 107 which is slidably mounted in a bore 108 in the frame 10 so as to move against the arm. The bore 108 communicates with the slot-shaped opening 105 so that the lever arm 104 may swing into the path of travel of the locking plunger 107 and be moved thereby.

Locking plunger 107 is forced to move to locking position by a compression spring 109 seated at its lower end in a recess 110 in plunger 107 and abutting at its upper end against a disk 111, that is held loosely within the bore 108 against the lower plate 96. The initial pressure of the spring 109 is varied by any suitable means such as an adjustment screw 112 threaded into the lower plate 96 and bearing against the disk 111. To provide access to the adjustment screw 112, a clearance hole 113 is formed substantially coaxially with the screw 112 through the plates lying above the screw. A cam surface 114 of low inclination is formed on the lower end of the lever arm 104, said surface being adapted to contact with a shoulder 115 located at the edge of a notch 116 in the locking plunger 107.

The aforementioned outer support member 91 which is used in conjunction with the clamping jaws 89 and 90 for clamping the lens is slidably mounted in the frame 10 so as to bear against the outer edge of the lens 88 with a definite pressure in a position substantially opposite to said jaws. Preferably the lens contacting surface 117 of the support member is formed of a resilient material such as rubber and is somewhat spherically curved as shown for advantageous accommodation of lenses having different shapes and curvatures. The surface 117 extends along an upstanding crosshead 118 which is movably mounted relative to the frame 10 on mounting rods 119 and 120 which are fixed in said crosshead at one end and slidably telescoped into the bores 121 and 122 of a corresponding pair of hollow rods 123 and 124 which are slidably held in the frame at either side of the spindle 24 as best shown in Fig. 4. For coordinating the sliding motion of the hollow rods 123 and 124, a cross bar 125 is fixed to the outer ends thereof in any preferred manner.

Means are provided for varying the normal clamping position of the outer support member 91 to accommodate various sizes of lenses comprising an adjustment member 126 mounted in any desired manner, such as a screw thread 127, for movement through the outer support member and abutting on its inner end against the crossbar 125. A tension spring 128, housed within a bore 129 and extending freely through an opening 130 in crossbar 125, is anchored by means of a swivel connection to the adjustment member 126 at one end and to the frame 10 at its other end in any suitable manner such as that shown in Fig. 2, the spring being under a definite tension which causes the support member 91 to move toward the jaws 89 and 90 and thus clamp the lens 88. Protection from harmful material such as lint and dirt is provided for the screw thread 127 and the mounting rods 119, 120 and hollow rods 123, 124 by the telescoping covers 131 and 132 attached respectively to the frame 10 and the crosshead 118.

Unitary release means, as best shown in Figs. 4 and 5, for manually releasing the clamping pressure of the movable jaw 90 in sequence to releasing the clamping pressure of the outer support member 91 are provided comprising a release bar 133 which is slidably mounted in the frame 10. An extended recess 134 is formed longitudinally in the upper surface of the release bar 133 into which the nose 135 of the locking plunger 107 projects. Opening into the recess 134 is a slot 136 having closed ends wherein a movable cam member 137 is slidably fitted, no part of which projects above the surfaces of the release bar. Referring to Fig. 5, inclined cam surfaces 138 and 139 are provided on the cam member 137 and the locking plunger 107, respectively, by which the plunger is raised to unlocking position. When in clamping position, the cam surfaces 138 and 139 are slightly spaced apart so that the full pressure of the spring 109 is applied solely to the lever arm 104 by means of cam surface 114 and shoulder 115.

For releasing the outer support member 91, a keylike laterally projecting cam 140, having inclined surface 141, is provided on release bar 133. The surface 141 is aligned with an adjacent cooperating cam surface 142 on a crosstie bar 143 attached on the ends of the hollow rods 123 and 124. When in clamping position, the cam surfaces 141 and 142 are slightly spaced apart to assure that the entire force of the spring 128 is applied to urge surface 117 against the edge of the lens 88. The outer support member 91 is operated in sequence to the operation of the movable jaw 90 by reason of the fact that the cam surfaces 138 and 139 for operating the jaw 90 are spaced farther apart than the cooperating cam surfaces 141 and 142 for member 91.

The cam surface 139 may be changed in longitudinal position relative to the cam surface 138 by a rotatable stem 144 threaded into the movable cam 137. The stem 144 is prevented from moving endwise by an integral collar 145 which snugly fits within a recess in a retainer cap 146 which in turn is fixed in any preferred manner on the outer end of the release bar 133. The stem 144 is extended beyond the cap 146 and the knob 147 is fixed thereon. Longitudinal motion is imparted to the release bar 133 by the clamping lever 148 pivoted at 149 to the frame 10 and connected to the bar 133 by a pin 150 fixed in the bar 133 so as to slide within an elongated slot 151 in the lever 148 as shown in Fig. 4.

For controlling the distance from the edge of the lens to a hole drilled therein, there is provided a locater member 153 having an abutting surface 152 against which an edge of the lens 88 is placed before clamping. Locater member 153 is slidably fitted into a recess 154 extending across the intermediate plate 97 and is held therein by the overlying plate 92. To a downwardly directed ear 155 on the rear end of member 153 there is fixed a block 156 in which a projecting antifrictional roller 157 is pivoted. Motion of the locater member 153 toward the lens 88 is produced by endwise movement of a regulating bar 158 which is slidably mounted crosswise of the locater member in an opening 159 formed cooperatively by the frame 10 and the plates 92, 96, and 97. Endwise movement of the regulating bar 158 imparts movements to the locater member 153 by means of a cam surface 160 formed at substantially 45° to the surface of the regulating bar which faces the roller 157. A spring actuated plunger 161 slidably mounted in the lower plate 96 and pressing against the ear 155 urges the roller 157 into firm contact with the cam surface 160.

In connection with locater member 153, there is provided a strap gauge 162 wherein a lens holding strap of an ophthalmic mounting can be gauged to determine the corresponding edge distance of the hole to be drilled. The gauge 162 comprises a fixed upstanding pin 163 anchored in a boss 164 which protrudes from the frame 10 and a movable gauge fork 165 which is moved by the regulating bar 158 and may, if desired, be a part thereof as shown in Fig. 4. Fixed gauge pin 163 extends vertically into an open ended slot 166 and is slightly tapered towards its top so as to fit within the screw holes of an ophthalmic mounting strap. A curved seating surface 167, symmetrical with the slot 166 is provided on the movable gauge fork 165 against which the shoe of an ophthalmic mounting strap is adapted to rest while gauging.

Movement is imparted to the locater member 153 and gauge fork 165 in equal amounts by the regulating bar 158 actuated by a knob 168 connected to transmit thrust to the bar 158 by means of the threaded shaft 169. Endwise motion of the shaft 169 is prevented by an integral flange 170 confined in a closely fitting recess formed in the block 171 which is fixed in the opening 159.

Motive power is provided for the spindle pulleys 27 and 28 by a motor 172 having shaft extensions 173 and 174 at either end on which are motor pulleys 175 and 176, respectively. The driving connections preferably consist of the belts 177 and 178 extending between the motor pulleys and the spindle pulleys.

The motor 172 is balanced for equalizing the tension of the driving belts 177 and 178 by pivoting it in a motor supporting cradle 179. As shown in Fig. 1, the cradle 179 comprises a ring 180 fixed in any preferred manner to the midsection of the motor 172 and having attached thereto trunnions, one of which is shown at 181, disposed substantially in the plane of the center of gravity of the motor. The trunnions 181 are carried in upstanding portions 183 of the cradle 179 and may, if desired, be provided with vibration-absorbing members 185 interposed between the cradle and the motor. The cradle 179 is pivotally mounted for motion toward and away from the drilling machine about a rod 187 which extends through lugs 188 integrally cast on a frame extension 189. A connecting wall 190, extending between the upstanding portions 183, unifies the cradle 179 and provides a belt guard for the lower belt 178. A tension member of any suitable form, such as the screw 191 connected to the cradle 179 at a favorable leverage point 192 and anchored in the frame extension 189, serves to tension the belts.

Adequate protection for the operator from the danger of moving parts is afforded by a guard or cover member 193 affixed to the frame 10 in any suitable way such as by the supporting posts 194 and retaining screws 195 threaded therein.

In this type of machine, it is found advantageous to supply drilling lubricant to the drilling tools 54 and 55 immediately before the drill is applied to the lens, especially since one of the drills operates in an inverted position. This desirable feature is here provided by a lubricant feed pump 196 connected by any suitable actuating means, such as the mechanical and electrical means shown in Fig. 6, to the operating lever 60 of the reciprocating mechanism for the drill spindles 23 and 24. As here disclosed, a switch mechanism 197 actuated by a lug 198 on the operating lever 60 selectively controls energization of a pair of opposed electromagnetic solenoids 199 and 200 which magnetically reciprocate a free piston 201 so as to pump measured quantities of lubricant to the nozzles 202 and 203 in response to motion of the reciprocating mechanism. Drilling lubricant is stored in a tank 204 which is connected at the bottom to a suitable self-actuated valve structure 205 of conventional form which communicates with the pump chambers 206 and 207.

Electrical power for energizing the solenoids 199 and 200 is supplied from a power circuit 208, connected to a central flexible contact arm 209 by a lead 210. Contacts 211 and 212 on contact arm 209 are normally free from their mating contacts 213 and 214 which are, respectively, connected to leads 215 and 216 terminating at the solenoids 200 and 199, respectively. The solenoid circuits are completed through the common lead 217 to the power supply. An insulated fork 218 fixed to the central arm 209 straddles the lug 198 on the lever 60 so as to actuate the switch 197 upon movement of the lever.

In the operation of this embodiment of the invention, the clamping lever 148 is swung outwardly, thus first causing the support member 91 to open and then the lower jaw 90 to open in sequence. The lens 88 is inserted between the jaws 89 and 90 with its edge against the locator member 153, the lens being positioned meantime in such a manner that a previously affixed drilling mark thereon appears in the center of the flared slot 102. Clamping lever 148 is then moved inwardly to clamp the lens 88 in two sequential steps, by first closing of the jaw 90 and then by moving inwardly the support member 91. More particularly, movement of the release bar 133 to the right (Fig. 5) results in the descent of the locking member 107 under the pressure of the spring 109 until the locking member wedges the lever arm 104 into firm clamping position such that displacement caused by drilling pressure from the upper drill is prevented. Further movement of the release bar 133 to the right carries the cam surface 141 out of contact with the cam surface 142 thus allowing the spring 128 to move the outer support member 91 inwardly until the surface 117 bears firmly against the outer edge of the lens 88.

The motor 172 is then started and by depressing the hand lever 56, against the tension of spring 81, the upper drilling tool 54 is moved downwardly towards the lens 88 and the lower drilling tool 55 is moved downwardly away from the lens by virtue of the interconnection of the levers 56 and 60. As the operating lever 56 starts to move downwardly, the contacts 211 and 213 of the switch 197 are closed to thereby energize the solenoid 200 and move the free piston 201 to deliver a measured quantity of lubricant through the upper nozzle 202 to the upper side of the lens 88 where the hole is to be drilled. With the continued downward movement of lever 56 the drilling tool 54 contacts the lens and bores about half way through the lens until the downward travel is stopped by engagement of the lever 56 with the stop member 83. Upon release of the hand lever 56, the spring 81 raises the spindles 23 and 24 to normal centralized position. By an upward stroke of the hand lever 56, the contacts 212 and 214 of switch 197 are closed, thus energizing the solenoid 199 and moving the piston 201 in a reversed direction to deliver a measured quantity of lubricant through the nozzle 203 to the underside of the lens 88. Immediately thereafter, and with continued upward movement of lever 56, the lower drilling tool 55 contacts the lens and drills the hole to completion in perfect alignment with the first part of the hole, the travel of the tool 55 being arrested by the engagement of lever 60 with the stop member 84.

The handle lever 56 is then lowered so that the driling tools 54 and 55 again reach normal inoperative position, the clamping lever 148 is swung outwardly to release the lens 88, first by releasing the outer support member 91 and then by releasing the movable jaw 90 through engagement of the cams 141, 142 and 138, 139 respectively, so that the lens 88 may be removed.

Since the jaw 90 is pivotally mounted, it swings open through a greater angle to accommodate a thick lens than it does for a thin lens. Within a limited range of lens thicknesses, this change of normal clamping position of jaw 90 is accommodated for since the locking member 107 lodges at a higher position along the cam surface 114 on the lever arm 104 when clamping a thick lens than when clamping a thin lens. To compensate for this change of position, the movable cam member 137 is moved endwise of the release bar 133 to maintain the required clearance between the cam surfaces 139 and 138 when in clamping position. The "normal clamping position" of jaw 90 is set in accordance with the edge thickness of the lens as above mentioned by rotating the nob 147 to the proper setting as indicated by the index 220 which cooperates with the circular scale 219.

The "normal clamping position" of the outer support member 91 may be adjusted to suit lenses of different widths by rotating the adjustment member 126 so that the index 222 aligns with the lens width number on its scale 221. When the adjustment screw 126 is rotated, the mounting rods 119 and 120 slide within the hollow rods 123 and 124, respectively, the end of the adjustment member being maintained firmly at all times against the cross bar 125 by the action of spring 128. By this mechanism, the clamping movements of the outer support member 91 are always of the same magnitude, regardless of the length of the lens being clamped.

Setting of the locater member 153 for different edge distances of drilled holes can be accomplished by the following method. The screw hole location on the lens holding strap of an ophthalmic mounting is measured on the edge distance gauge 162 by placing the screw hole on the pin 163. The knob 168 is then rotated until the shoe of the ophthalmic mounting contacts the curved fork 167, the regulating bar 158 and cam surface 160 simultaneously being moved away from the gauge. The spring-actuated plunger 161 thereupon moves the locater member 153 toward the cam surface 160 by an amount equal to the movement of the bar 158 which automatically places the locater member in a position corresponding with the setting of the edge distance gauge.

It will be noted that each drill spindle together with its associated bearing structure is constructed to form a readily demountable subassembly which is held in place by a set screw. This feature is common to the embodiments shown in both Figs. 2 and 7. In removing the upper sub-assembly, for instance, the set screw is unscrewed and the belt 177 is removed from its pulley. After the keys 69, 70 have been disengaged from their respective slots, the drill spindle unit comprising the spindle 23 and sleeve 43, pulley 27 and bearing member 17 can be removed from the opening 11 in the frame 10 and thereafter can be serviced or replaced as a unit.

Figure 7:
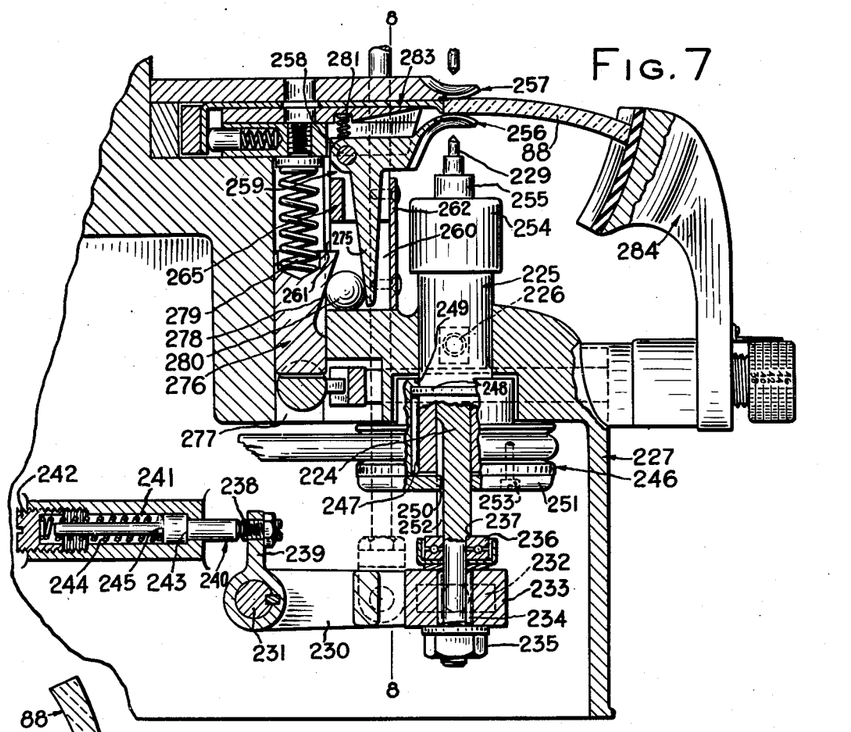
Fig. 7 is a partial midsectional view of a second embodiment of our invention.
Figure 8:
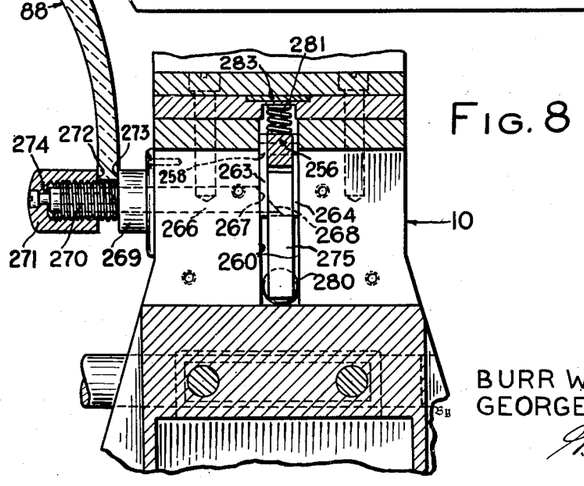
Fig. 8 is a fragmentary sectional view taken on the line 8—8 of Fig. 7.

In the second embodiment of this invention, illustrated in Figs. 7 and 8, the general arrangement is similar to the first embodiment, particularly as to the general arrangement of the upper and lower drill spindle mechanisms, but it has different features embodied in the spindles and lens clamping mechanism.

Because of the similarity of the upper and lower drill spindle structures of the second embodiment, it is considered sufficient to describe only the lower assembly and show it in Fig. 7. In this form of drill spindle design, a lower drill spindle 224 in alignment with an upper drill spindle, not shown and spaced therefrom, is rotatably and slidably journaled in a lower sleeve bearing 225 which is removably held by a set screw 226 in the lower of two aligned openings in the frame 227. The end of the drill spindle is bored to receive a drilling tool 229 which is fixed therein by any suitable means such as a set screw.

Reciprocation mechanism for the drill spindle 224 comprises a bifurcated fork 230 fixed on a lower operating shaft 231 which is connected by linkage mechanism to a duplicate upper operating shaft, not shown, so as to produce synchronous identical movements of both upper and lower drill spindles. The bifurcated free ends of the fork 230 are connected by sliding keys 232, similar to the keys 69 and 70 shown in Fig. 1, to a lower thrust collar 233 rotatably mounted in any preferred manner, such as the needle bearing 234, on the lower end of the spindle 224. The thrust collar is secured on the drill spindle by suitable means such as a retaining nut 235 on one side and by a thrust bearing 236 abutting a shoulder 237 on the other side.

The means for normally holding the drill spindles in inoperative position are combined with the means for stopping the spindles at the end of their respective operative strokes, said means comprising a stop screw 238 threaded into the up-turned lug 239 on fork 230 and locked in position by a lock nut threaded thereon. An abutment plunger 240 is slidably mounted in the bore 241 in the frame 227 and an adjustable abutment plug 242 is threaded into the other end of the bore 241 against which the plunger abuts to limit the stroke of the drill spindles. A shoulder 243 is provided on the plunger 240 which rests against an abutment shoulder in the end of the bore opposite to the plug 242 when the spindle 224 is in normal inoperative position. For returning the plunger 240 to inoperative position, a compression spring 244 is seated against the abutment plug 242 at one end and bears against a shoulder 245 on the plunger at the other end. Adjustment of the stroke of the drill spindle is accomplished by changing the position of the abutment plug 242 while the adjustment of the inoperative position of the drill spindle is accomplished by resetting the stop screw 238. This same type of mechanism is also embodied in the upper drill spindle structure.

Means for rotating the drill spindle 224 are quite similar to that of the first embodiment and comprise a spindle pulley 246 rotatably mounted by the needle bearing 247 on the portion of the sleeve bearing 225 which extends beyond frame 227. An annular flange 248 on the bearing 225 adjacent the needle bearing cooperates with an interior annular flange 249 on the pulley 246 to keep the pulley on the sleeve bearing. The pulley is rotatably and slidably connected to the drill spindle 224 by an internal spline 250 formed in the bore of a cover plate 251, said spline slidably engaging within the longitudinal splineway 252 in the drill spindle 224. Cover plate 251 is held by suitable means such as screws 253 onto its pulley 246. To prevent foreign material from entering the lower spindle bearing surface, a protective cap 254, telescoping over the upper portion of the sleeve bearing 225 where it protrudes above frame 227, is removably held on the end of the spindle 224 in any desired manner such as by a suitable lock screw.

The lens clamping mechanism of this embodiment of our invention resembles, generally, the corresponding mechanism of the first embodiment and similar parts have similar functions. However, the mechanism of the second embodiment is capable of clamping effectively lenses having a greater range of thickness at the edge. This is accomplished by changing the normal clamping position of the movable jaw, in accordance with the edge thickness of the lens to be clamped, without changing the angular position of the movable jaw. A movable clamping jaw 256, pivoted on pin 258 fixed in carriage member 259, cooperates with the stationary clamping jaw 257. The carriage member 259 is freely slidable in a parallel sided guideway 260 in the frame 227. Guideway 260 is partially formed by interior vertical ribs 261 on the frame and partially by an exterior bearing plate 262 screwed to the front of the frame so as to contact the back and front surfaces respectively of the carriage member as shown in Fig. 7. The carriage member 259 which is somewhat U-shaped in cross section, has side walls 263 and 264 in which the pivot pin 258 is seated and a back wall 265 connecting the side walls.

Motion of the carriage member 259 toward or away from the stationary jaw 257 is accomplished by an adjustment member 266 slidably held in the frame 227 so as to project beneath the carriage member 259 and support it. Cooperating cam surfaces 267 and 268 are formed on the adjustment member 266 and carriage member 259, respectively, whereby endwise movement of the adjustment member 266 transmits vertical motion to the carriage member 259.

Means for calipering the edge thickness of the lens are provided on the side of the frame 227 and comprise a fixed collar 269 surrounding the adjustment member 266 and a setting knob 271 having calipering faces 272 and 273, respectively, thereon between which the edge of the lens 88 is inserted. The setting knob 271 is threaded onto the outer surface of a tubular supporting extension 270 on the collar 269 for providing relative motion between the calipering faces 272 and 273. Knob 271 serves as unitary means for actuating both the lens calipering element 272 and the adjustment member 266 since the latter extends through the extension 270 and has its end secured to the setting knob 271 by means of a swivel connection 274 of any desirable form.

Clamping pressure is applied to an integral lever arm 275 on the movable jaw 256 by a locking plunger 276 slidably mounted in a bore 277 in the frame 227. A cam surface 278 inclined to its direction of motion is formed on the locking plunger 276 and downward motion is imparted thereto by a spring 279 pressing against the upper end thereof. Upon downward movement of the locking member 276, pressure is transmitted from the cam surface 278 through a transmission member, such as a ball 280 lying in the guideway 260, to the lever arm 275 to clamp the lens 88 between jaws 256 and 257. A spring 281 which urges the carriage member 259 against the cam surface 267 on the adjustment member prevents the latter from turning. It will be seen that the thrust connection from the cam surface 278 to the lever arm 275 is equally effective for all vertical adjustments of the lever arm. A portion of the cam surface 278 is formed on a key-like extension on the locking member 276 which projects between the vertical ribs 261 to prevent rotation of the locking member in the bore 277. A locator member 283 for governing the edge distance of a hole to be drilled in the lens and an outer support member 284 for clamping the lens are also provided so as to operate in the same manner as in the first embodiment of this invention.

The operation of this form of the invention is the same as the operation of the first embodiment except as to the clamping procedure. First, the locator member 283 is set for the correct edge distance of the hole to be drilled and the outer support member 285 is adjusted to correspond to the size of the lens 88. The edge of a lens, having a drilling mark thereon, is then inserted in the calipering device and the lens thickness is measured. While the calipering faces 272 and 273 are being moved to grip the lens, the operating member 266 simultaneously moves the movable jaw 256 vertically so that the normal clamping position of the jaw automatically corresponds to the calipered edge thickness of the lens. From this point on, the clamping procedure used with the first embodiment is followed.

Similarly to the first embodiment, both the upper and lower drill spindles and bearing sub-assemblies may be removed as a unit and interchanged with a duplicate new drill spindle unit when repair or replacement is necessary. As shown in Fig. 7, the lower drill spindle unit may be removed by first removing the protective cap 254 from the end of the drill spindle 224 and then loosening the set screw 226. Next the keys 232 are disconnected from the thrust collar 233 and the driving belt is removed from the pulley 246. Subsequently, the lower drill spindle unit, comprising the drill spindle 224, bearing member 225, spindle pulley 246, needle bearing 247, thrust bearing 236, thrust collar 233, and retaining nut 235, may be withdrawn from the opening in the frame 227.

It will be seen that there is here provided a lens drilling machine having improved drill spindle structure and lens clamping mechanism by which lenses of various sizes, shapes and thicknesses may be drilled expeditiously and with a minimum of spoilage, all in accordance with stated objects of this invention.

Although but certain embodiments of this invention have been shown and described in detail, it will be understood that other embodiments are possible and changes may be made in form and

We claim:

1. In a lens drilling machine having a frame, a pair of longitudinally aligned and spaced, axially movable drills journaled in said frame, and feed means for moving both drills simultaneously in the same direction relative to the frame so that one drill at a time acts from opposite sides against a lens to be drilled, the combination of clamping means for holding said lens in a fixed position relative to the frame in the space between the drills while a hole is completely drilled through the lens, said clamping means including a stationary jaw and a movable jaw in alignment with each other so as to grip the opposite refractive surfaces of said lens, the movable jaw having a lever arm thereon, a locking member slidably mounted in the frame adjacent the active end of the lever arm, a cam connection between the locking member and the lever arm, a spring bearing against the locking member to move it into locking engagement with the arm, said clamping means also including a lens support member slidably connected to the frame for movement toward and away from the stationary jaw so as to bear against the outer edge of the lens, spring means acting to force the support member against the edge of the lens, and a release member movably mounted adjacent to both the locking member and support member and operably connected thereto so as to cause these two last-named members to release the lens upon movement of the release member in a releasing direction.

2. In a lens drilling machine having a frame, a pair of spaced, coaxial drill spindles rotatably and slidably mounted on the frame, drilling tools carried by said spindles, and feed means for moving the spindles coincidentally in the same direction relative to the frame so that one tool at a time acts against a lens to be drilled from opposite sides, the combination of clamping means for holding said lens in a fixed position with reference to the frame in the space between said spindles while a hole is drilled entirely through the lens, said clamping means including an upper jaw fixed to the frame and a lower jaw movably mounted on the frame and aligned with the upper jaw for clamping the lens on its refractive surfaces, said clamping means further including a lens support member engageable with the outer edge of the lens opposite to the jaws and movable toward the jaws, a locking plunger slidably mounted in the frame, a first spring seated on the plunger and urging it in a locking direction, power multiplying means operably connected between the plunger and the lower jaw whereby movement of the plunger in a locking direction causes clamping pressure to be applied to the lower jaw, a second spring connected between the frame and lens support member to force the support member against the edge of the lens, a release member mounted so as to move in close proximity relative to both the plunger and support member, and cam-like projections on said release member by which the plunger and the support member are individually operated by the release member, said projections being so spaced relative to the plunger and support member that movement of the release member in a releasing direction first causes release of the support member and then the plunger.

3. In a lens drilling machine having a frame, a pair of drill spindles rotatably and slidably journaled in said frame in axial alignment and in opposed spaced relation, drilling tools carried by said spindles, and feed means for moving first one of said tools and then the other against opposite sides of a lens to drill a hole to completion therethrough, the combination of clamping means for holding said lens stationary with respect to said frame in the space between the drill spindles until said hole is completed, said clamping means including a stationary jaw and a movable jaw between which said lens is clamped on its refracting surfaces, means for applying clamping pressure to said movable jaw, a carriage member on which said movable jaw is pivotally carried, the carriage member being movable toward and away from said stationary jaw to vary the normal clamping position of the movable jaw relative to the stationary jaw, a slidable adjustment member having an inclined connection to said carriage member to move it toward and away from the stationary jaw upon movement of the adjusting member, and a calipering member movably mounted on said frame for measuring the edge thickness of the lens, said calipering member having a stem operably connected to said adjustment member for simultaneous movement therewith whereby the normal clamping position of the movable jaw is set in accordance with the setting of the calipering member.

BURR W. JONES,
GEORGE C. SCHELLING.

REFERENCES CITED

The following references are of record in the file of this patent:

UNITED STATES PATENTS

| Number | Name | Date |
|---|---|---|
| 1,575,308 | Alger et al. | Mar. 2, 1926 |
| 1,762,872 | Manley | June 10, 1930 |
| 2,321,822 | Kendis | June 15, 1943 |